United States Patent
Granjeon (10) Patent No.: US 9,514,096 B2
(45) Date of Patent: Dec. 6, 2016

(54) METHOD OF DEVELOPING A SEDIMENTARY BASIN FROM A STRATIGRAPHIC SIMULATION OF MULTILITHOLOGIC FILLING TAKING ACCOUNT OF FINE SEDIMENT TRANSPORT

(71) Applicant: IFP Energies nouvelles, Rueil-Malmaison (FR)

(72) Inventor: Didier Granjeon, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 1059 days.

(21) Appl. No.: 13/675,124

(22) Filed: Nov. 13, 2012

(65) Prior Publication Data

US 2013/0132047 A1    May 23, 2013

(30) Foreign Application Priority Data

Nov. 17, 2011  (FR) ...................................... 11 03500

(51) Int. Cl.
*G01N 15/08* (2006.01)
*G06F 17/10* (2006.01)
(Continued)

(52) U.S. Cl.
CPC .............. *G06F 17/10* (2013.01); *G01V 1/282* (2013.01); *G01V 11/00* (2013.01); *G01V 99/005* (2013.01)

(58) Field of Classification Search
USPC .......................................................... 702/12
See application file for complete search history.

(56) References Cited

U.S. PATENT DOCUMENTS 5,844,799 A    12/1998  Joseph et al.
2004/0267454 A1    12/2004  Granjeon
(Continued)

FOREIGN PATENT DOCUMENTS

EP    1 435 527 A1    7/2004

OTHER PUBLICATIONS

Rabineau, M. et al: "Sedimentary Sequences in the Gulf of Lion: A record of 100,000 Years Climatic Cycles", Marine and Petroleum Geology, Butterworth Scientific, Guildford, GB., vol. 22, No. 6-7, Jun. 1, 2005 (Jun. 1, 2006), pp. 775-804, XP027687505, ISSN: 0264-8172.

(Continued)

*Primary Examiner* — Paul D Lee
(74) *Attorney, Agent, or Firm* — Fitch, Even, Tabin & Flannery LLP (57) ABSTRACT

The invention is a method of developing a sedimentary basin from a stratigraphic simulation of multilithologic filling accounting for fine sediment transport. The sedimentary basin is divided into geologic layers with each geologic layer being subdivided into a series of climatic layers. Each climatic layer is associated with at least one constant climatic parameter. A stratigraphic simulation is performed within each climatic layer using a stratigraphic model. The sediment transport in the continental domain and sediment bottom layer transport in the marine and lacustrine domains are modelled using nonlinear diffusion equations under maximum erosion rate constraint. Suspended sediment transport in the marine and lacustrine domain is modeled using an advection-diffusion equation accounting for a particle fall rate and of a marine and lacustrine current velocity. The climatic layers belonging to a single geologic layer are then homogenized and the basin is developed according to the stratigraphic simulation results.

28 Claims, 4 Drawing Sheets

(51) Int. Cl.
G01V 99/00 (2009.01)
G01V 1/28 (2006.01)
G01V 11/00 (2006.01)

(56) References Cited

U.S. PATENT DOCUMENTS

2007/0219725 A1* 9/2007 Sun .................. G01V 1/282
   702/13
2011/0240310 A1* 10/2011 Sun .................. G01V 99/00
   166/369

OTHER PUBLICATIONS

Granjeon, D., et al: "Using a 3-D Stratigraphic Model to Optimize Reservoir Description", Petroleum Engineer International, Hart Publications, US, Nov. 1, 1998 (Nov. 1, 1998), pp. 51-54, 56, XP000831236, ISSN: 0164-8322, figures 1-3.
Eymard, R., et al: "Multi-Lithology Stratigraphic Model Under Maximum Erosion Rate Constraint", International Journal of Numerical Methods in Engineering, Chichester, GB, vol. 60, No. 2, May 14, 2004 (May 14, 2004), pp. 527-548, XP008043580, ISSN: 0029-5981, DOI: 10.1002/NME.974, pp. 529-536.
Robin, C. et al: "Expression and Modelling of Stratigraphic Sequence Distortion", Sedimentary Geology, Elsevier, Amsterdam, NL, vol. 178, No. 3-4, Jul. 15, 2005 (Jul. 15, 2005), pp. 159-186, XP027840035, ISSN: 0037-0738, pp. 171-173.

* cited by examiner

1- BASIN TOPOGRAPHY AT THE TIME tk,i-1

2 - WATER BALANCE (RAIN-EVAPORATION) AND LAKE LEVEL CALCULATION

3 - EROSION, TRANSPORT AND SEDIMENTATION IN THE CONTINENTAL DOMAIN (EXCEPT LAKES)

4 - MARINE CURRENTS CALCULATION

5 - SUSPENDED PLUME TRANSPORT

6 - BOTTOM CURRENT FLOW

*FIG. 4*

METHOD OF DEVELOPING A SEDIMENTARY BASIN FROM A STRATIGRAPHIC SIMULATION OF MULTILITHOLOGIC FILLING TAKING ACCOUNT OF FINE SEDIMENT TRANSPORT

CROSS-REFERENCE TO RELATED APPLICATIONS

Reference is made to French Application Serial No. 11/03.500, filed on Nov. 17, 2011, which application is incorporated herein by reference in its entirety.

BACKGROUND OF THE INVENTION

1. Field of the Invention

The invention relates to the petroleum industry and notably oil exploration through the study of sedimentary basins. The method of the invention can be used in any application requiring characterization of the geometry and of the nature of the layers making up a sedimentary basin and in particular (1) in oil exploration during the study of boundary zones, the evaluation of new fields and the characterization of oil reservoirs, and (2) in geological storage of gas and fluids such as $CO_2$ or hydrogen. In particular, the invention is a method allowing determination of the distribution of fine and coarse sediments in a sedimentary basin, over large time and space scales (duration of the order of some thousand years to some hundreds of million years and horizontal distance of the order of several tens of to several hundred kilometers).

2. Description of the Prior Art

The major current trends in oil exploration are on the one hand moving towards increasingly complex zones (mountain range foothills, ultra-deep marine zones, shale gas, etc.) and, on the other hand, in optimizing recovery from already discovered reservoirs. Similarly, storage of more and more resources or waste in geological sites is desired. In order to meet these two objectives, it is important to best characterize the distribution of sediments in sedimentary basins and, in particular, the relative distribution of the coarse sediments and of the fine sediments. Indeed, these two types of sediment play a major role regarding the flow properties of fluids in rocks. The coarse sediments are generally permeable and the fine sediments are impermeable. Good characterization of a sedimentary basin thus requires good understanding of the stratigraphy of the basin, that is the geometry of the sedimentary layers and the distribution of the fine and coarse sediments within these layers.

Tools and notably computer tools (computer, software, etc.) are used to carry out simulations allowing obtaining a representation (referred to as stratigraphic simulation) that describes the stratigraphic architecture of a sedimentary basin. To achieve these simulations, a tool is used, known as a stratigraphic (numerical) model, allowing accounting for these aspects in an approximate manner. A stratigraphic model is a set of equations simulating the evolution over time of the sedimentary basin, as a result of three major processes which are (1) the creation (or elimination) of a space available for sedimentation by tectonic, eustatic and flexural movements, (2) the sediment supply to the basin, either through boundaries, or through the agency of in-situ production or precipitation, and (3) the transport of these sediments in the available space created.

Such a tool (stratigraphic model) is used in software for simulating deterministically the stratigraphic response of the sedimentary system to the variations over time of physical processes. The DionisosFlow® software (IFP Energies nouvelles, France) is an example of such a software.

Two main approaches are conventionally used which are (1) geometric and geostatistical approaches, wherein the geometry of the horizons and the nature of the rocks are defined manually or mathematically, and (2) deterministic approaches based on a simulation of the sedimentary processes which are basin deformation, sediment supply and transport of these sediments to the basin. The present invention contributes to the second approach, generally referred to as "stratigraphic forward modelling."

This type of stratigraphic modelling appeared in the 1970s, in particular with the work carried out by Harbaugh and Bonham-Carter, 1970, who provided a series of very simple models. This precursory work (Tetzlaff and Harbaugh, 1989, Martinez and Harbaugh, 1993) gave rise to many stratigraphic models, generally classified in two major families which are process-based stratigraphic forward models and slope-based stratigraphic forward models.

Process-based models relate to the evolution of a sedimentary system over short periods of time, generally of the order of years to thousands of years. The first one is the Sedsim model (e.g. Tetzlaff and Harbaugh, 1989, Martinez and Harbaugh, 1993, Li et al., 2006, Salles et al., 2010), which simulates the evolution of shallow clastic and carbonate environments, and of turbiditic environments in deep marine domains. This model allows determining the stratigraphic architecture of sedimentary reservoirs and formations over relatively long periods of time (years to hundreds of thousands of years). More recently, many research teams became interested in process-based stratigraphic modelling (Driscoll and Karner, 1999, Harris and Wiberg, 2001, Bitzer and Salas, 2002, Kubo et al., 2005, Overeem et al., 2005). These models are concerned with the evolution of a sedimentary system over short periods of time (some tens of thousands of years being the maximum). These models thus rely on an extensive description of physical processes, in particular water flow in the fluvial domain or the marine domain. They can thus simulate in detail transient phenomena such as the flow of a dense current on the sea bottom, or the migration of sand dunes under the action of a beach drift or of a marine current. However, they generally focus on a single depositional environment which is the continental and fluvial domain, the deltaic domain, or the deep marine domain, having either clastic or carbonate sediments.

Slope-based models use a simpler description of the physical processes and assume that the sedimentary system is in dynamic equilibrium. That is the water flow is stationary and the sediment transport can be described by a diffusion equation relating the transported sediment flux to the slope of the basin (hence the name of this model family). The first diffusive models were developed in order to study in 2 dimensions (x,z) the evolution of mountain ranges, as well as the evolution of scarps, deltas and clastic margins. The most recent work has allowed showing that using a 3D diffusion equation enables correct description of the evolution of sedimentary systems having coarse sediments (sand, gravel) such as alluvial cones, deltas and deep marine turbiditic systems, as well as carbonate systems and mixed systems (clastic and carbonate). EP Patent 1,435,527 for example describes a modelling method for generating a 2D or 3D diffusive type stratigraphic model allowing simulation of the multilithologic filling of a sedimentary basin over geological time periods. According to this method, modelling is based on the numerical simulation of the evolution of a sedimentary basin, from past to present, in a series of time intervals. At each time interval, three major phenomena interact and are modelled numerically which are the basin deformation, the sediment supply and the transport of these sediments in the deformed basin. The long-term permanent transport (reptation process, slow diffusion process, etc.), the short-term transport (induced by rains and floods) and the catastrophic transports (due to cliff collapses notably) are taken into account for sediment transport modelling, using an exponential water velocity model.

The main advantage of slope-based models is to allow fast and realistic modelling of the evolution of sedimentary systems over long time periods and large distances. These models are thus increasingly used in the petroleum field to evaluate exploration scenarios or to better characterize petroleum systems, and various approaches have been patented recently, but they are dedicated to coarse sediment modelling and do not take account of fine sediments.

These various methods involve certain drawbacks:
process-based stratigraphic models do not allow studying the evolution of sedimentary systems over geologic times (millions to hundreds of millions of years), due to the fineness, as well as the complexity of the description of the physical processes that are involved. Furthermore, most models focus on short-term processes (thousands of years being the maximum) and therefore disregard the impact of subsidence or compaction on the stratigraphy of sedimentary basins, slope-based stratigraphic models are ideal for the time and space scales considered in the present invention, but they are dedicated to coarse or mixed carbonate or clastic systems, thus disregarding suspended fine sediments. Using a diffusion equation of the topography allows simulation of the evolution of a topography over long time periods and obtaining a quite realistic description of the transport of coarse sediments. However, these models are ill-suited for simulation of the transport of fine particles that move mainly through advection and diffusion in the marine domain.

SUMMARY OF THE INVENTION

The invention thus relates to a method of developing a sedimentary basin, wherein an image describing the geometry of geologic layers forming the basin and a distribution of the sediments within these layers is constructed by a stratigraphic simulation. This simulation accounts for the transport, in the sedimentary basin, of fine (grain diameter of the order of tens of microns to millimeters) to coarse (grain diameter of the order of millimeters to centimeters) sediments. This is achieved by a discretization in a homogeneous layer regarding the climatic parameters, and of nonlinear modelling of the sediment transport in the continental domain and of the sediment bottom layer transport in the marine and lacustrine domain, and by modelling the suspended sediment transport in the marine and lacustrine domain.

The invention relates to a computer-implemented method of developing a sedimentary basin, wherein an image describing a geometry of geologic layers forming the basin and a distribution of the sediments within the layers is constructed. The method comprises:

dividing the sedimentary basin into geologic layers with each geologic layer corresponding to a sediment deposition for a given time period;

subdividing each geologic layer into a series of climatic layers with each climatic layer being associated with at least one constant climatic parameter;

carrying out an iterative stratigraphic simulation, from the past to a more recent time, within each climatic layer, using a computer-implemented stratigraphic model modelling a sediment transport in the continental domain using a first nonlinear diffusion equation under maximum erosion rate constraint, modelling a suspended sediment transport in the marine and lacustrine domain using an advection-diffusion equation accounting for a particle fall rate and of a marine and lacustrine current velocity; and modelling sediment bottom layer transport in the marine and lacustrine domain using a second nonlinear diffusion equation under maximum erosion rate constraint;

homogenizing the climatic layers belonging to a single geologic layer; and developing the sedimentary basin from the image comprising the homogenized layers.

According to an embodiment, sediment classes making up the sedimentary basin are defined with each class corresponding to a set of sediments having a given grain size and origin µ. In this embodiment, the nonlinear diffusion equations can define the flux of sediment of class k as proportional to the water stream flowing at the surface of the ground ($q_{eau}$) to the power of n, and to the local slope of the basin (S) to the power of m, with n and m being two different constants for the first and the second nonlinear diffusion equation.

Thus, the nonlinear diffusion equations have a form as follows:

$$\vec{q}_k = -\lambda C_k K_{fluv,k} q_{eau}{}^n \|\vec{S}\|^{m-1} \vec{S}$$

with:
$q_k$ being a sediment flux of class k
$\lambda$ being an erosion constraint
$c_k$ being a concentration in sediments of class k in the flow
$q_{eau}$ being a dimensionless water stream flowing in the channel
$S$ being a local slope of the basin
$K_{fluv,k}$ being a fluvial diffusion coefficient of the sediments of class k, for the first nonlinear diffusion equation, and $K = K_{m,k}$ being the marine and lacustrine diffusion coefficients of the sediments of class k, for the second nonlinear diffusion equation.

According to this embodiment, the suspended sediment transport in the marine and lacustrine domain can be modelled by writing an evolution of a height of sediment of class k in the suspended plume ($e_k$) as a function of an advection equation and a diffusion equation accounting for a particle fall rate and a velocity of the marine and lacustrine currents.

The suspended transport in the marine and lacustrine domain can thus be modelled by the equation as follows:

$$\frac{\partial e_k}{\partial t} = \underbrace{div(A\,grade_k)}_{diffusion} + \underbrace{div(-e_k \vec{u})}_{advection} - \lambda_{s,k} e_k$$

with:
$e_k$ being the height of sediment of class k in the suspended plume
A being the diffusion coefficient of the plume
u being the marine current velocity
$\lambda_{s,k}$ being the particle fall coefficient.

According to the invention, stratigraphic simulation can comprise modelling a basin deformation by performing a deformation of the climatic layer due to tectonic subsidence and to eustatic variations, using a restoration software providing a construction and restoration process for structural models.

According to the invention, stratigraphic simulation can comprise modelling a sediment supply by determining a supply at the basin boundaries and/or a production or a precipitation within the basin, from environmental parameters, such as a water depth and a wave energy, and from climatic parameters, such as the temperature or an evaporation rate.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

The method according to the invention allows generation of an image describing the geometry of geologic layers forming a sedimentary basin and the distribution of the sediments within these layers, with a goal of developing the sedimentary basin. Development can be oil exploration during the study of boundary zones, evaluation of new fields, characterization of oil reservoirs or development through hydrocarbon extraction from these reservoirs. Development can also be geological storage of gas and fluids such as $CO_2$ or hydrogen.

The image is generated by a computer-implemented stratigraphic simulation method. The simulation method according to the invention allows obtaining a deterministic stratigraphic simulation over long time periods (on the order of ten thousand years to a hundred million years) and large distances (some tens to hundreds of kilometers), in 2D and in 3D, and to characterize the geometry of the sedimentary layers and the distribution of the fine and coarse sediments within these layers.

Figure 1:
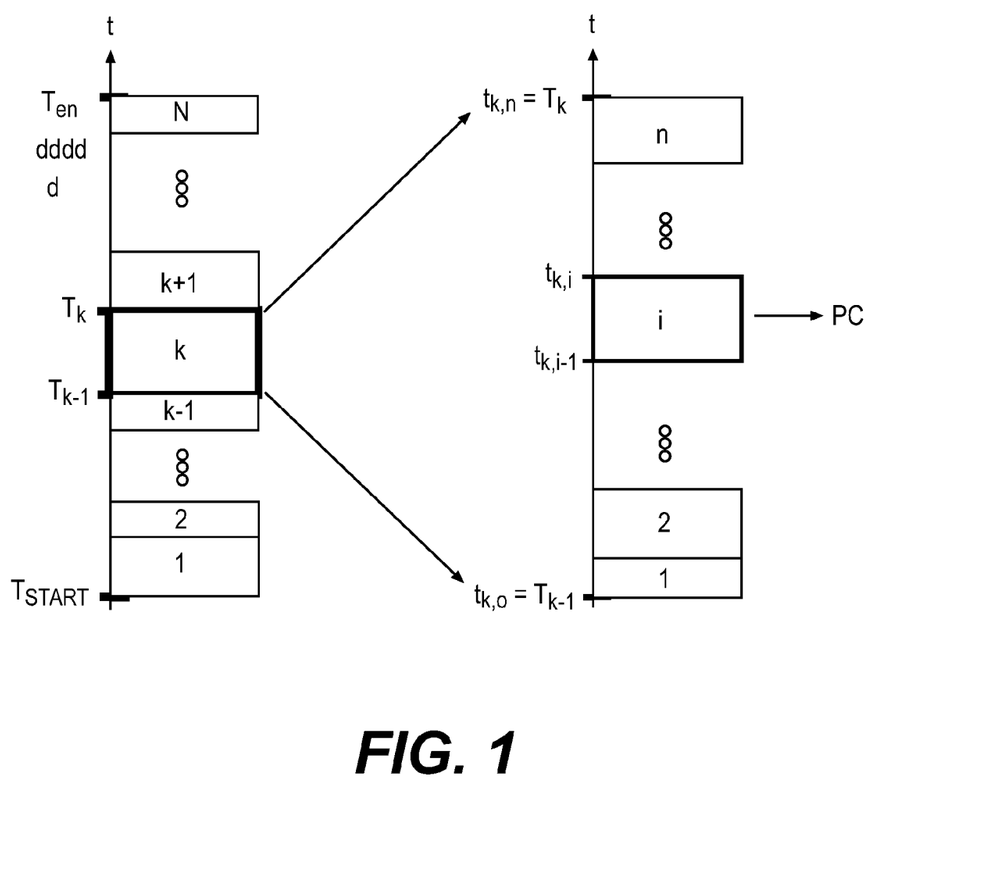
FIG. 1 is a flowchart showing the principle of breaking up dividing a sedimentary basin into geologic layers with each geologic layer being subdivided into climatic layers whose modelling is described in FIG. 2.

The method of developing a sedimentary basin according to the invention comprises the following stages:
A. Generating an image of the basin including:
  1. Dividing the sedimentary basin into geologic layers
  2. Dividing each geologic layer into climatic layers
  3. Stratigraphic simulation accounting for the transport of fine sediments
  4. Homogenization of the climatic layers
B. Developing the sedimentary basin
  1. Dividing the Sedimentary Basin into Geologic Layers
  Computer-implemented stratigraphic modelling of a sedimentary basin is obtained iteratively from past to present, or at least to a more recent time, in a series of variable time intervals, of the order of thousands of years to millions of years (see FIG. 1). Dividing the sedimentary basin into geologic layers of variable time lengths allows best representing the heterogeneities of the sedimentary layers and in particular to describe both short but important events, such as the deposition of evaporites during the Messinian salinity crisis (major crisis in the Mediterranean Sea that occurred 5.3 million years ago, and lasted 500 000 years maximum), and much longer events, such as the formation of the Mediterranean substrate before this Messinian crisis (more than 240 million years of geological history). FIG. 1 illustrates on the left the breaking up of the basin into geologic layers, where t represents time, $T_{start}$ being the simulation start time, Ten being the simulation end time, and $T_k$ and $T_{k-1}$ are intermediate times with layer k corresponding to the time period between these two intermediate times.

2. Breaking Up Each Geologic Layer into Climatic Layers

However, the duration of this geologic layer is too long to allow the climatic variations within this layer to be apprehended in detail, although they have a major effect on the stratigraphy. The Milankovitch cycles, of a duration ranging from 20 000 to 40 000 years, which controlled the deposition of an alternation of argillaceous sediments rich in organic matter and of evaporitic sediments in the Sorbas basin in Spain, during the Messinian crisis, can be mentioned by way of example (Sierro et al., 1999, Krijgsman et al., 2001, Rohling et al., 2008). It is important to be able to apprehend this climatic variability to correctly describe the sediment distribution in the basin. Each geologic layer is thus subdivided into a series of climatic layers illustrated in FIG. 1 within which the climatic parameters, such as rain or the wave approach direction and intensity, are assumed to be constant. These climatic layers serve as a support to the numerical modelling described hereafter.

FIG. 1 illustrates on the right the dividing of geologic layer k into climatic layers, where t represents time, $t_{k,i}$ are intermediate times of geologic layer k with geologic layer k being divided into n climatic layers.

Definition of the Climatic Parameters (PC in FIG. 1)

The climatic parameters, such as rainfall and evaporation rate (defined by rainfall and evaporation maps, or curves relating rainfall and evaporation to topography), and the wave approach direction and intensity, are defined and assumed to be constant for the duration of this layer.

3. Stratigraphic Simulation Accounting for the Transport of Fine Sediments

Figure 2:
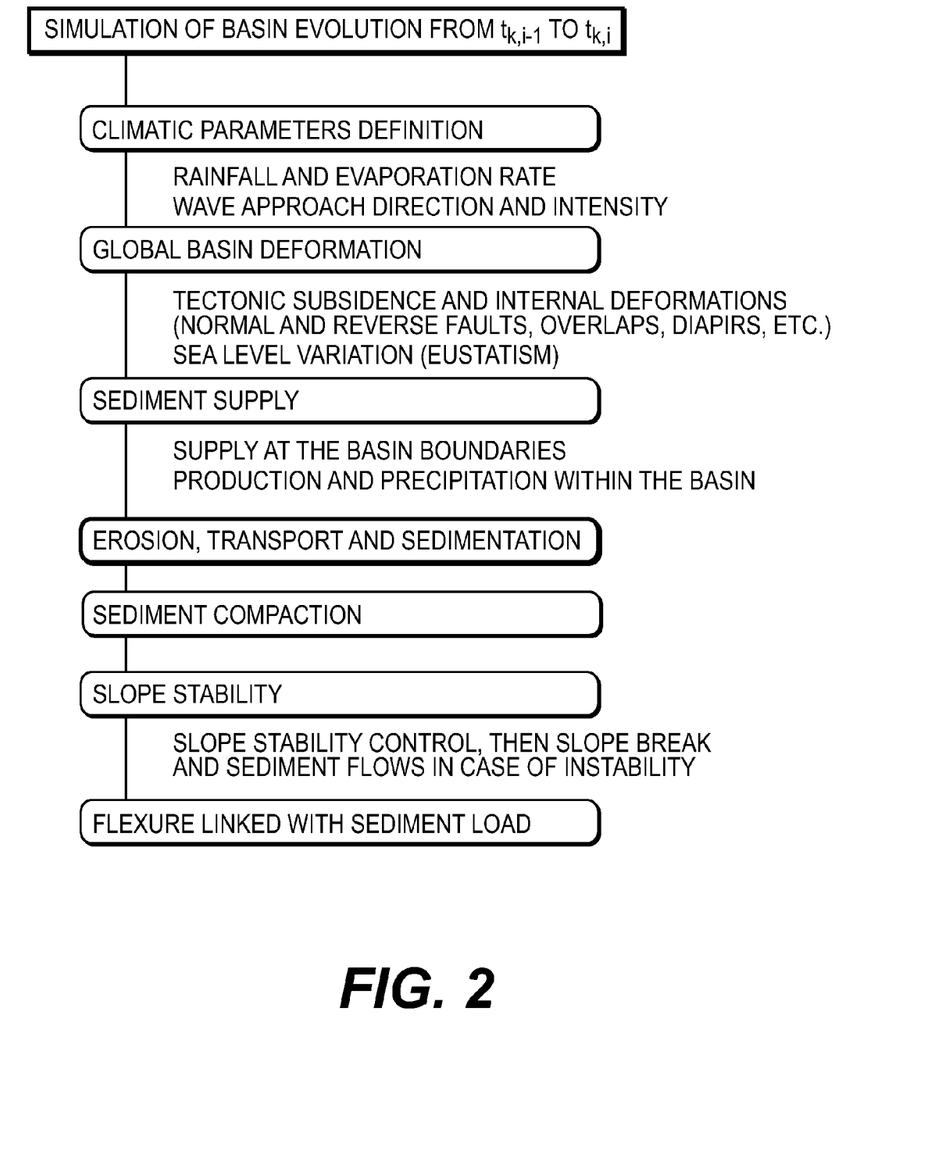
FIG. 2 is a flowchart showing all of the operations required to simulate the evolution of a sedimentary basin between two ages to obtain a new climatic layer as defined in FIG. 1.

The simulation of each climatic layer follows the flowchart of FIG. 2. In this stage, an iterative simulation, from the past to a more recent time, is carried out within each climatic layer using a stratigraphic model.

According to the invention, the stratigraphic model comprises the following characteristics:

Sediment transport in the continental domain is modelled using a nonlinear diffusion equation under maximum erosion rate constraint (the flux of each sediment class is proportional to the water stream flowing on the ground surface, to the power of n, and to the local slope of the basin, to the power of m being with n and m two constants), Suspended sediment transport in the marine and lacustrine domain is modeled using an advection-diffusion equation accounting for the particle fall rate (as a function of the sediment grain size and of the flocculation processes) and of the marine and lacustrine current velocity (defined assuming that the water flow is a potential flow); and Sediment bottom layer transport in the marine and lacustrine domain is modelled using a second nonlinear diffusion equation under a maximum erosion rate constraint (the flux of each sediment class is proportional to the water stream flowing on the ground surface, to the power of n', and to the local slope of the basin, to the power of m', with n' and m' two constants).

These specific features of the stratigraphic model are described in point iii of the description of a stratigraphic model that is preferably used. A stratigraphic model having the following characteristics is preferably used:

i. Global Deformation of the Basin

The stratigraphic model computes the global deformation of the basin due to tectonic subsidence (defined point by point by maps) and to eustatic variations (sea level variation defined by a time-dependent curve). Furthermore, the internal deformations induced by the normal and reverse fault slips, the overlaps and the diapirs are taken into account. These structural deformations are imposed by the user who defines the movement of each node of the 3D stratigraphic mesh (this structural model is generally obtained by restoration software providing a structural model construction and restoration process, referred to as geomodeller, such as Kine3D (IFP Energies nouvelles, France)).

ii. Sediment Supply

It is assumed that the sedimentary rocks making up a sedimentary basin can be described by a finite number of sediment classes. Each sediment class thus corresponds to a set of sediments of given grain size and origin. Coarse sands, corals, algae, clays and evaporites can thus be distinguished. At each point of the basin, the lithology of the sedimentary rocks is thus described by the percentage of each sediment class of which they are made. A rock can thus be made up of 43% coarse sands and 57% clays, and another of 65% corals and 35% algae. This breaking up into a finite number of sediments allows simulating the evolution of each sediment independently of one another, from its origin to its deposition.

The sediment supply can correspond (1) to a supply at the basin boundaries (definition of the flux of each sediment at the boundary), or (2) to a production or a precipitation within the basin, depending on environmental (water depth, wave energy, etc.) and climatic (temperature, evaporation rate, etc.) parameters.

iii. Erosion, Transport and Deposition of Sediments

Figure 3:
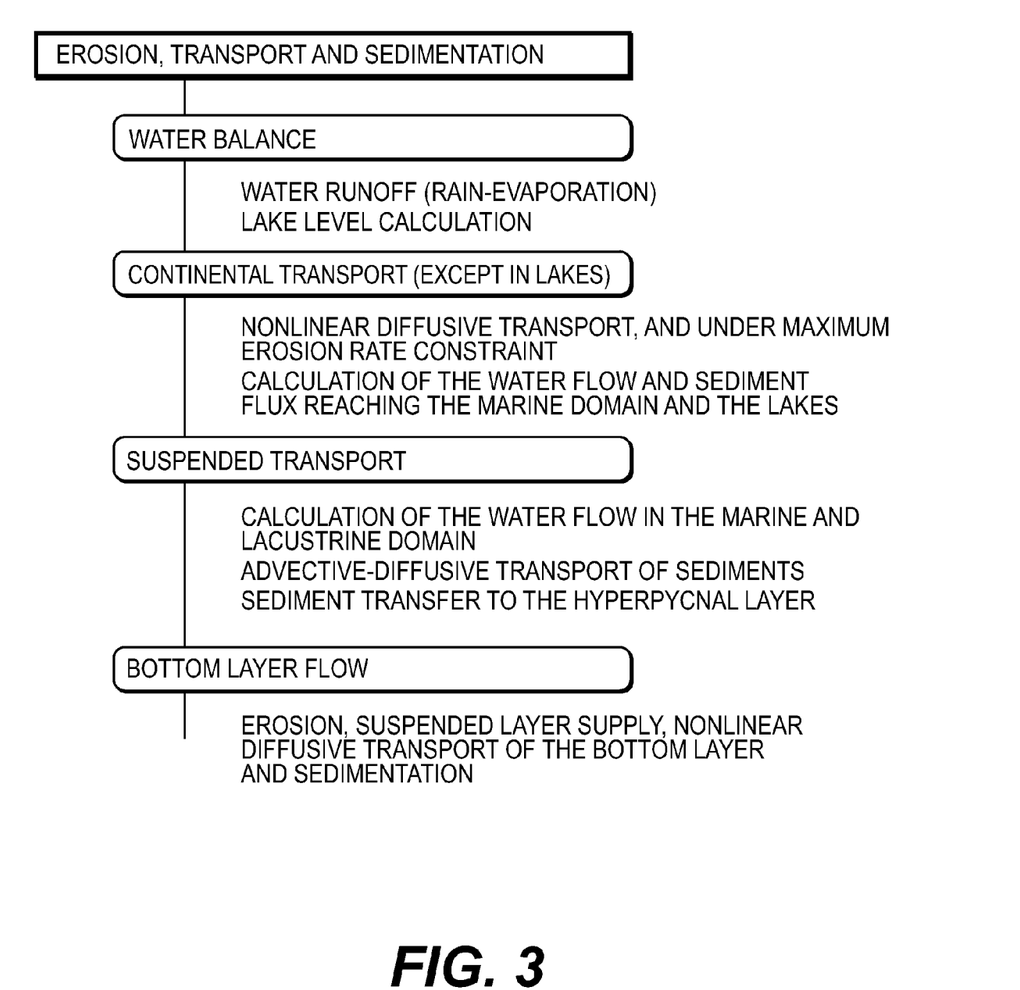
FIG. 3 is a flowchart showing the simulation of erosion, transport and sedimentation processes, required for characterization of a climatic layer.

This part is specific to the stratigraphic model according to the invention. The simulation according to the invention of the sediment transport processes (see flowchart FIG. 3 and the diagrams FIG. 4) allows the fine sediments to be taken into account.

a) Study Domain

Figure 4:
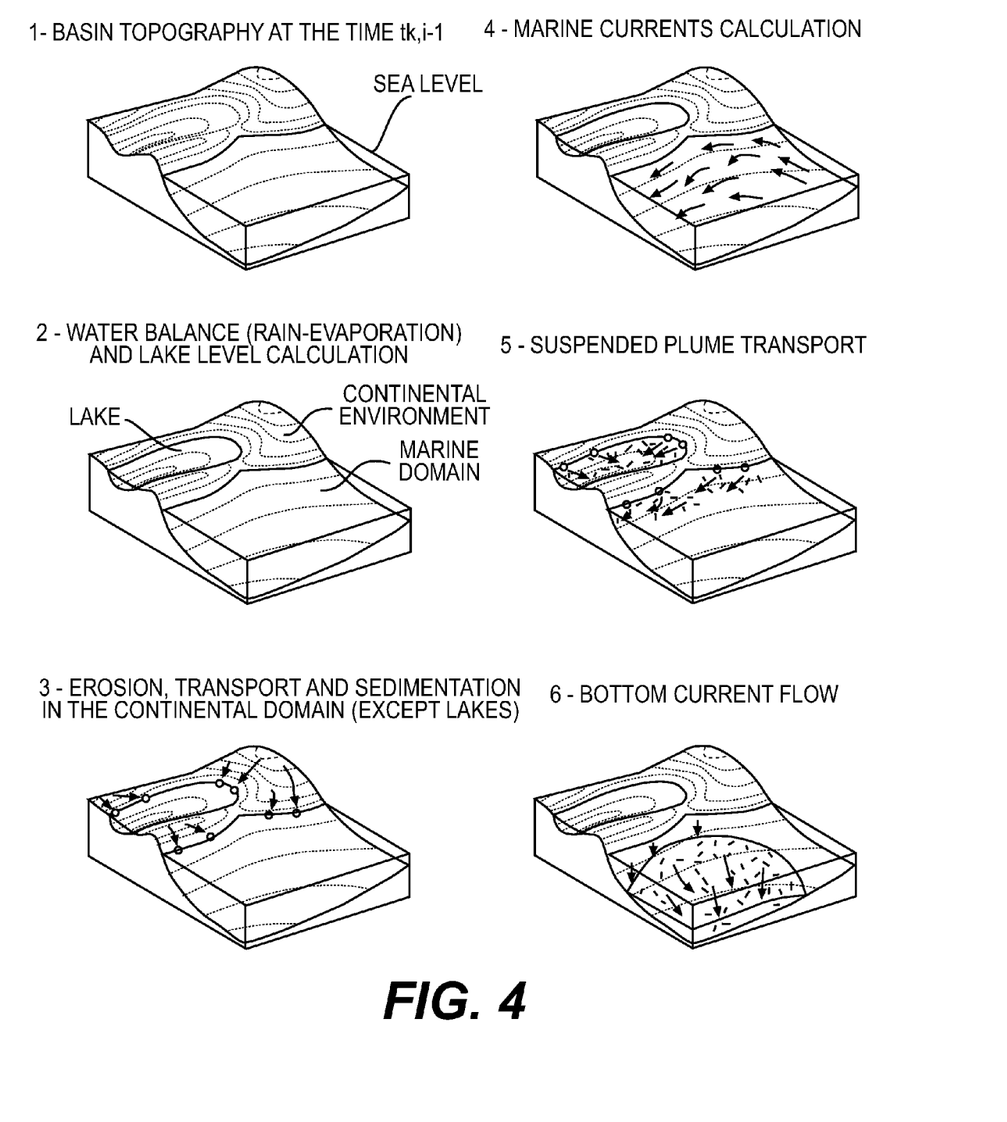
FIG. 4 is a flowchart having a series of 3D diagrams illustrating the main stages of the flowchart of FIG. 3.

The goal of the method is to simulate the evolution of a sedimentary basin, that is to determine, at any point x of basin $\Omega$ (with $\Omega$ a closed space of $R^d$, with d=1 or 2), the variations over time t of the lithologic nature and of the thickness h(x,t) of each sedimentary layer.

b) Water Balance (FIG. 4.2)

Drawing up the water balance starts with an analysis of the basin topography in order to define the location of the potential lakes. The rain and the evaporation are then defined at any point of the basin, either by assuming them to be constant, or by defining them with maps or curves relating for example these parameters to the ground altitude. The water runoff into the basin is then computed assuming that the water flow is permanent. This computation is carried out from upstream to downstream assuming that all the water reaching a given point of the basin is redistributed to all of its downstream neighbors, in proportion to the slope (the neighbor having the steepest slope will thus receive more water than the others) (a method referred to as Multiple Flow Direction), or it spreads on the surface of the lake and escapes through the topographic threshold defining the downstream outlet of the lake. This water balance allows defining, at any point of the basin, the water flow $Q_{eau}$ in $m^3/s$ that streams on the ground surface.

c) Continental Transport (Except in Lakes) (FIG. 4.3)

The sediment flux flowing at any continental point of the basin is then computed. This flux is defined by a nonlinear diffusive model as a function of the local slope of the basin and of the water flow streaming on the ground surface a set forth in the relationship below. Each sediment class is transported separately. The flux $q_k$ of each class is assumed to be (1) proportional to the sediment concentration in the flow, to the local slope and to the water flow, and (2) parallel to the local slope.

$$\vec{q}_k = -c_k K_{fluv,k} q_{eau}{}^n \|\vec{S}\|^{m-1} \vec{S}$$

with:

$q_k$ [$L^2/T$] is a sediment flux of class k. Vector $\vec{q}_k$ is parallel to the slope;

$c_k$ [–] is a class k sediment concentration in a flow;

$K_{fluv,k}$ [$L^2/T$] is a fluvial diffusion coefficient of sediments in the flow k;

$q_{eau}$ [–] is a dimensionless water stream flow (water flow in $m^3/s$, divided by a reference water flow, equaling 100 $m^3/s$);

S [–] is local slope of the basin (or topography gradient); and n and m [–] are exponents.

Flux $q_k$ entering or leaving basin $\Omega$ is imposed by the user at any point of the boundary of $\Omega$.

The observation of current and ancient natural systems allows providing an order of magnitude for constants n and m that generally range between 1 and 2. Their precise values however depend on the case studied (size of the basin studied, climate, etc.) and especially on the simulated time period. To determine a precise value, an inversion can be performed. In general, nonlinear exponents (n=m=3/2) are selected when the simulation time is shorter than the equilibrium time of the sedimentary systems (of the order of one million years) and the impact of the climate variations on the stratigraphy are studied. Conversely, linear exponents (n=m=1) are selected when the simulation time is greater than the equilibrium time and when the formation of a mountain range over several ten million years is for example studied.

Applying the mass conservation principle coupled with a local production term for class k sediments allows defining the sedimentation rate, dh/dt, or the erosion rate if dh/dt<0, of each sediment class at any point of the continental domain, and to deduce therefrom the overall sedimentation or erosion rate of the topography wherein:

$$(1 - \Phi_s) c_{k,s} \frac{\partial h}{\partial t} = P_k - \vec{\nabla} \cdot \vec{q}_k$$

with:

$\Phi_s$ [–] is porosity of the sediments close to the ground surface;

$c_{k,s}$ [–] is concentration in sediment k close to the ground surface;

h [L] is total sediment thickness;

$P_k$ [L/T] is local production of sediment k; and $q_k$ [$L^2/T$] is class k sediment flux.

In case of an erosion rate (dh/dt which is negative), it is assumed that this rate cannot exceed a maximum erosion rate E depending on the lithologic nature of the ground. Fine sands are thus more readily eroded than indurated carbonates. In order to meet this constraint on the erosion rate, it is assumed that the flux of each sediment class is defined by the nonlinear diffusion equation described above, to which a multiplying factor λ has been added, which allows the erosion constraint to be fulfilled:

$$(1-\Phi_s)\frac{\partial h}{\partial t} \geq -E \Leftrightarrow \vec{q}_k = \lambda_{c_k} K_{fluv,k} q_{eau}^n \|\vec{S}\|^{m-1} \vec{S}$$

λ [–] is an erosion constraint, as great as possible, and ranging between 0 and 1.

The flow of water is obtained and the flux of each sediment class reaching boundary Γ of the lacustrine and marine domains (it should be noted that several lakes or marine domains can coexist at the same time in the model). These parameters are used as boundary conditions for the suspended model described hereafter.

d) Suspended Transport

At each point of boundary Γ between the continental domain(s) and the lacustrine and marine domains, the sediment flux feeds a suspended plume that is transported in an advective and diffusive manner by the lacustrine and marine currents. These currents are first calculated by assuming that the water flow is irrotational and by disregarding the viscosity of the water (FIG. 4.4). It is thus assumed that the water flow is a potential flow:

$$\frac{\partial}{\partial x}\left(b\frac{\partial H}{\partial x}\right) + \frac{\partial}{\partial y}\left(b\frac{\partial H}{\partial y}\right) = 0$$

b [L] is water depth;
H [L] is hydraulic potential;
; $\vec{u}$ equals $-g\vec{r}ad\,H$;
u [L/T] is marine current velocity; and
H [L] is hydraulic potential.

Each sediment class is then transported separately in this plume to take account for its fall rate (FIG. 4.5). This fall rate is defined according to the grain size characteristic of this lithology, and to the possible flocculation processes likely to occur at the boundary between the continental domain and the lacustrine and marine domains. The suspended plume is assumed to be at equilibrium. The variation of the plume height tends towards 0 at any point of the basin. The sediments entering the plume (the incoming sediment flux is defined by the fluvial transport equation described above) are thus all redistributed in this plume by the currents and diffusion, then they leave the plume and feed the bottom currents as described.

$$\frac{\partial e_k}{\partial t} = \underbrace{div(A\,grade_k)}_{diffusion} + \underbrace{div(-e_k\vec{u})}_{advection} - \lambda_{s,k}e_k \to 0$$

wherein:
$e_k$ [L] is a height of lithology k in the suspended plume;
A [L²/T] is a plume diffusion coefficient;
u [L/T] is a marine current velocity (=plume advection velocity); and $\lambda_{s,k}$ [T⁻¹] is a particle fall coefficient, proportional to the fall velocity of these particles.

In the case of sediments having a high fall velocity (typically above 0.1 mm/s), the suspended transport can be disregarded due to the very fast sediment outflow from the suspended plume.

e) Bottom Layer Transport

The bottom layer is a fluid flow (water+sediment) denser than sea water. It is also referred to as hyperpycnal flow to indicate that the density is higher than that of the ambient water.

It is assumed that the flow of the bottom layer (FIG. 4.6) is governed by a nonlinear diffusive equation, like the fluvial flow. The flux of each sediment class is assumed to be proportional to the erosion constraint, to a diffusion coefficient, to the water flow and to the local slope.

$$\vec{q}_k = -\lambda c_k K_{m,k} q_{eau}^{n'} \|\vec{S}\|^{m'-1} \vec{S}$$

wherein:
$q_k$ [L²/T] is flux of sediment k;
λ [–] is an erosion constraint;
$c_k$ [–] is class k sediment concentration in the flow;
$K_{m,k}$ [L²/T] are marine and lacustrine diffusion coefficients in lithology k;
$q_{eau}$ [–] is a dimensionless water stream flowing in the channel (water flow in m³/s, divided by a reference water flow, equal to 100 m³/s);
S [–] is a local slope of the basin (or topography gradient); and
n', m' [–] are constants (different from n and m).

The observation of current and ancient natural systems allows giving an order of magnitude for constants n' and m' that generally range between 1 and 2. As in the fluvial case, these parameters are defined by a sensitivity study.

Applying the mass conservation principle coupled with a local production term (case of marine carbonates for example) and with a source term corresponding to the sediment flux flowing out of the suspended plume allows defining the sedimentation or the erosion rate at any lacustrine and marine point with the relationships.

$$(1-\Phi_s)c_{k,s}\frac{\partial h}{\partial t} = P_k + \lambda_{s,k}e_k - \vec{\nabla}\cdot\vec{q}_k'$$

iv. Sediment Compaction

After the deposition of this new climatic layer and the erosion of the ancient ones, the mechanical compaction induced by this burial modification is computed. The mechanical properties of a sediment are considered and defined from the characteristics of each lithology of which it is made, by balancing the weight of each lithology by its concentration in the sediment being studied. In order to account for mechanical compaction, the porosity of each lithology is directly related to the maximum burial reached by the sediments, using a relation of exponential form, as described in:

Parasnis, D. S., 1960. The Compaction of Sediments and its Bearing on Some Geophysical Problems. Journal of the Royal Astronomical Society 3, 1, 1-28.

v. Stability of the Slopes

The unstable zones of the basin are then determined by applying a critical slope criterion. The critical slope varies locally and depends on the lithologic nature of the sediments in the ground. Any unstable zone, that is any portion of a sedimentary column located above the stability plane defined by the critical slope, undergoes a mass displacement by applying the Newtonian equation. The acceleration of the unstable mass is computed by drawing up a balance of the forces applied onto this mass, gravity and friction. This equation allows simulation of the mass movement of the unstable zone and then its deposition when its velocity falls below a critical value.

vi. Flexure Linked with the Sediment Load

Once the new sedimentary layer is defined, its impact is computed on the deformation of the basin. Indeed, at each point of the basin, the sedimentary column, as well as the sea water column, if the point considered is in the marine domain, creates a pressure on the lithosphere which is assumed to be elastic. Any pressure variation induces a flexural deformation of the sedimentary basin that is computed by solving an elastic beam equation in 2D.

4. Homogenization of the Climatic Layers

The climatic layers are then homogenized to form geologic layers. The double decomposition into geologic layers and climatic layers allows modelling of the evolution of a sedimentary basin in detail (climatic layers) while keeping a coarse but pertinent mesh that is coarse (geologic layers) to describe the heterogeneities of the sediments.

5. Exploration and Development of the Sedimentary Basin

The nonlinear diffusive model according to the invention, which accounts for the suspended plume, allows obtaining very precise simulations of the stratigraphy of sedimentary basins that is of the geometry of the sedimentary layers and of the distribution of the lithologies within these layers. In particular, due to the fact that the suspended plume is taken into account, the nonlinear diffusive model according to the invention allows better description of the heterogeneities of the sedimentary layers and correctly estimating the distribution of the fine and coarse sediments within a sedimentary basin.

The nonlinear diffusive stratigraphic model can be used for the exploration of sedimentary basin boundary zones, the evaluation of new fields, the characterization of oil reservoirs or the development by extraction of hydrocarbons from these reservoirs. Development can also occur in the geological storage of gas and fluids such as $CO_2$ or hydrogen.

Using the model requires knowledge of three major parameters which are the deformation of the basin over time, the sediment supply and the transport of these sediments in the basin. Depending on the degree of knowledge of the basin being studied and on the data available, two extreme methods can be used. In the absence of geologic data obtained from outcrops, wells or seismic surveys (case of boundary zones exploration), the parameters required by the method can result from conceptual models. The basin deformation is defined by a structural scheme validated by a thermo-mechanical modelling of the lithospheric movements, the sediment supply, and rainfall and evaporation are defined with reference to the current climatic zones with the transport parameters being assumed being equivalent to those of the current rivers. Conversely, in the case of evaluation of new fields, many data are already available. The basin deformation and the sea level variations are defined by a backstrapping method as in basin modelling (of Temis type), the sediment supply is estimated from the data by dividing the volume of sediment deposited by the sedimentation duration, and the transport parameters are estimated from the assumed deposition profiles. The value of each of these parameters is then refined by an inversion loop.

The invention claimed is:

1. A sedimentary basin development method wherein an image describing a geometry of geologic layers forming the basin and a distribution of the sediments within the layers of the sedimentary basin is constructed, comprising:
   dividing the sedimentary basin into geologic layers with each geologic layer corresponding to a sediment deposition for a given time period;
   subdividing each geologic layer into a series of climatic layers with each climatic layer being associated with at least one constant climatic parameter;
   constructing the image describing a geometry of the geologic layers forming the basin by carrying out a computer-implemented iterative stratigraphic simulation, from a past time to a more recent time, within each climatic layer using a computer-implemented stratigraphic model wherein:
   a sediment transport in a continental domain is modeled using a first nonlinear diffusion equation under a maximum erosion rate constraint;
   a suspended sediment transport in the marine and lacustrine domain is modeled using an advection-diffusion equation accounting for a particle fall rate and of a marine and lacustrine current velocity;
   a sediment bottom layer transport in the marine and lacustrine domain is modeled using a second nonlinear diffusion equation under a maximum erosion rate constraint;
   homogenizing the climatic layers belonging to a single geologic layer to form the geologic layers; and
   developing the sedimentary basin from the image comprising the homogenized layers to at least one of locate hydrocarbons in the basin, to acquire hydrocarbons from the basin, to store gas, or to store fluids in the basin.

2. A method as claimed in claim 1, wherein:
   sediment classes making up the sedimentary basin are defined with each class corresponding to a set of sediments having a given grain size and origin, and wherein the nonlinear diffusion equations define the flux of sediment of a class k proportional to the water stream flow to a power of n, and to a local slope of a basin to a power of m, with n and m being constant exponents of the first and the second nonlinear diffusion equations.

3. A method as claimed in claim 2, wherein the nonlinear diffusion equations are as follows:

$$\vec{q}_k = -\lambda C_k K_{fluv,k} q_{eau}^n \|\vec{S}\|^{m-1} \vec{S}$$

with:
   $\vec{q}_k$ being a sediment flux of class k
   $\lambda$ being an erosion constraint which is a multiplication factor
   $c_k$ being a concentration in sediments of class k in water flow
   $q_{eau}$ being flow of a dimensionless water stream flow
   $\vec{S}$ being a local slope of the basin; and
   $K_{fluv,k}$ is a fluvial diffusion coefficient of the sediments of the class k, for the first nonlinear diffusion equation.

4. A method as claimed in claim 3, comprising:
   modeling the suspended sediment transport in the marine and lacustrine domain from an evolution of a height of sediment of the class k in a suspended plume as a function of an advection equation and a diffusion equation accounting for a particle fall rate and of a velocity of the marine and lacustrine currents.

5. A method as claimed in claim 4, comprising:
modeling the suspended transport in the marine and lacustrine domain by an equation as follows:

$$\frac{\partial e_k}{\partial t} = \underbrace{div(A\,grad e_k)}_{diffusion} + \underbrace{div(-e_k \vec{u})}_{advection} - \lambda_{s,k} e_k$$

with:
$e_k$ being height of sediment of class k in the suspended plume
A being a diffusion coefficient of the plume
$\vec{u}$ being marine current velocity
$\lambda_{s,k}$ being a particle fall coefficient.

6. A method as claimed in claim 5, wherein:
stratigraphic simulation comprises modelling a basin deformation by performing a deformation of the climatic layer due to tectonic subsidence and to eustatic variations using a restoration software executed on a computer providing a construction and restoration process for structural models.

7. A method as claimed in claim 6, wherein:
stratigraphic simulation comprises modelling a sediment supply by determining a supply at basin boundaries and/or a production or a precipitation within the basin from environmental parameters.

8. A method as claimed in claim 5, wherein:
stratigraphic simulation comprises modelling a sediment supply by determining a supply at basin boundaries and/or a production or a precipitation within the basin from environmental parameters.

9. A method as claimed in claim 4, wherein:
stratigraphic simulation comprises modelling a basin deformation by performing a deformation of the climatic layer due to tectonic subsidence and to eustatic variations using a restoration software executed on a computer providing a construction and restoration process for structural models.

10. A method as claimed in claim 9, wherein:
stratigraphic simulation comprises modelling a sediment supply by determining a supply at basin boundaries and/or a production or a precipitation within the basin from environmental parameters.

11. A method as claimed in claim 4, wherein:
stratigraphic simulation comprises modelling a sediment supply by determining a supply at basin boundaries and/or a production or a precipitation within the basin from environmental parameters.

12. A method as claimed in claim 3, wherein:
stratigraphic simulation comprises modelling a basin deformation by performing a deformation of the climatic layer due to tectonic subsidence and to eustatic variations using a restoration software executed on a computer providing a construction and restoration process for structural models.

13. A method as claimed in claim 12, wherein:
stratigraphic simulation comprises modelling a sediment supply by determining a supply at basin boundaries and/or a production or a precipitation within the basin from environmental parameters.

14. A method as claimed in claim 3, wherein:
stratigraphic simulation comprises modelling a sediment supply by determining a supply at basin boundaries and/or a production or a precipitation within the basin from environmental parameters.

15. A method as claimed in claim 2, comprising:
modeling the suspended sediment transport in the marine and lacustrine domain from an evolution of a height of sediment of the class k in a suspended plume as a function of an advection equation and a diffusion equation accounting for a particle fall rate and of a velocity of the marine and lacustrine currents.

16. A method as claimed in claim 15, comprising:
modeling the suspended transport in the marine and lacustrine domain by an equation as follows:

$$\frac{\partial e_k}{\partial t} = \underbrace{div(A\,grad e_k)}_{diffusion} + \underbrace{div(-e_k \vec{u})}_{advection} - \lambda_{s,k} e_k$$

with:
$e_k$ being height of sediment of the class k in the suspended plume,
A being a diffusion coefficient of the plume,
$\vec{u}$ being marine current velocity, and
$\lambda_{s,k}$ being a particle fall coefficient.

17. A method as claimed in claim 16 wherein:
stratigraphic simulation comprises modelling a basin deformation by performing a deformation of the climatic layer due to tectonic subsidence and to eustatic variations using a restoration software executed on a computer providing a construction and restoration process for structural models.

18. A method as claimed in claim 17, wherein:
stratigraphic simulation comprises modelling a sediment supply by determining a supply at basin boundaries and/or a production or a precipitation within the basin from environmental parameters.

19. A method as claimed in claim 16, wherein:
stratigraphic simulation comprises modelling a sediment supply by determining a supply at basin boundaries and/or a production or a precipitation within the basin from environmental parameters.

20. A method as claimed in claim 15, wherein:
stratigraphic simulation comprises modelling a basin deformation by performing a deformation of the climatic layer due to tectonic subsidence and to eustatic variations using a restoration software executed on a computer providing a construction and restoration process for structural models.

21. A method as claimed in claim 20, wherein:
stratigraphic simulation comprises modelling a sediment supply by determining a supply at basin boundaries and/or a production or a precipitation within the basin from environmental parameters.

22. A method as claimed in claim 15, wherein:
stratigraphic simulation comprises modelling a sediment supply by determining a supply at basin boundaries and/or a production or a precipitation within the basin from environmental parameters.

23. A method as claimed in claim 2, wherein:
stratigraphic simulation comprises modelling a basin deformation by performing a deformation of the climatic layer due to tectonic subsidence and to eustatic variations using a restoration software executed on a computer providing a construction and restoration process for structural models.

24. A method as claimed in claim 23, wherein:
stratigraphic simulation comprises modelling a sediment supply by determining a supply at basin boundaries and/or a production or a precipitation within the basin from environmental parameters.

25. A method as claimed in claim 2, wherein:
stratigraphic simulation comprises modelling a sediment supply by determining a supply at basin boundaries and/or a production or a precipitation within the basin from environmental parameters.

26. A method as claimed in claim 1, wherein:
stratigraphic simulation comprises modelling a basin deformation by performing a deformation of the climatic layer due to tectonic subsidence and to eustatic variations using a restoration software executed on a computer providing a construction and restoration process for structural models.

27. A method as claimed in claim 26, wherein:
stratigraphic simulation comprises modelling a sediment supply by determining a supply at basin boundaries and/or a production or a precipitation within the basin from environmental parameters.

28. A method as claimed in claim 1, wherein:
stratigraphic simulation comprises modelling a sediment supply by determining a supply at basin boundaries and/or a production or a precipitation within the basin from environmental parameters.

\* \* \* \* \*